US008356233B2

(12) United States Patent
Nichols et al.

(10) Patent No.: US 8,356,233 B2
(45) Date of Patent: Jan. 15, 2013

(54) PSEUDO-NOISE INSERTION ON UNACCEPTABLE INPUT DATA SEQUENCE IN OPTICAL NETWORKS

(75) Inventors: Jeffery Thomas Nichols, Marietta, GA (US); Jeffrey Scott Moynihan, Cumming, GA (US)

(73) Assignee: Ciena Corporation, Hanover, MD (US)

( * ) Notice: Subject to any disclaimer, the term of this patent is extended or adjusted under 35 U.S.C. 154(b) by 330 days.

(21) Appl. No.: 12/783,209

(22) Filed: May 19, 2010

(65) Prior Publication Data

US 2011/0286742 A1 Nov. 24, 2011

(51) Int. Cl.
*H03M 13/00* (2006.01)
(52) U.S. Cl. .......................................... 714/776; 713/161
(58) Field of Classification Search .................. 714/776; 713/161
See application file for complete search history.

(56) References Cited

U.S. PATENT DOCUMENTS

2004/0015691 A1* 1/2004 Collette et al. ................ 713/161

* cited by examiner

*Primary Examiner* — Sam Rizk
(74) *Attorney, Agent, or Firm* — Clements Bernard PLLC; Christopher L. Bernard; Lawrence A. Baratta, Jr.

(57) ABSTRACT

The present disclosure provides systems and methods for inserting pseudo-noise in a data stream based on an unacceptable input data sequence in an optical network thereby preventing unnecessary loss of frame in SONET/SDH or Optical Transport Network (OTN) systems. The present disclosure includes a SONET/SDH or OTN framer, a transceiver, and a method for detecting an unacceptable data sequence or pattern and inserting a keep-alive or pseudo-noise sequence in the data sequence to maintaining framing on subsequent network elements, framers, transceivers, etc. For example, the present invention, upon receiving an unacceptable pattern of zeros or low ones density caused by a loss of signal condition or the like, may insert a pseudorandom noise pattern into the transmitted frame. This allows the downstream network element to continue a frame lock on the incoming signal, and thus keep the frame overhead and data communications channels from being lost.

16 Claims, 4 Drawing Sheets

PSEUDO-NOISE INSERTION ON UNACCEPTABLE INPUT DATA SEQUENCE IN OPTICAL NETWORKS

FIELD OF THE INVENTION

The present invention relates generally to fault management in communication systems. More particularly, the present invention provides systems and methods for inserting pseudo-noise in a data stream based on detection of an unacceptable input data sequence in an optical network thereby preventing unnecessary loss of frame in Synchronous Optical Network (SONET), Synchronous Digital Hierarchy (SDH), or Optical Transport Network (OTN) systems.

BACKGROUND OF THE INVENTION

In a telecommunication system, a loss of signal (LOS) condition received at a network element (NE) results in an all zeros pattern transmitted downstream. This all zeros pattern will cause a loss of frame (LOF) on all downstream network elements for all Optical Transport Network (OTN) frame rates. This problem was not as pronounced in SONET/SDH networks. In SONET/SDH, this loss of frame is based on pointer values resulting in a probability of detecting a loss of frame. In addition, this issue can only be seen at the higher SONET/SDH bit rates; e.g., OC-768/STM-256 and OC-192/STM-64. Although the initial network element will react to the loss of signal and insert an alarm indication signal (AIS), this will not occur before the insertion of the frame overhead, and more specifically this causes the data communications to be lost to the downstream network element. Loss of frame overhead and data communication channels to the downstream network elements causes unnecessary protection switching. This includes SONET/SDH Link Access Procedure (LAPS), Unidirectional Path Switched Ring (UPSR), Subnetwork Connection Protection (SNCP), Bi-directional Line Switched Ring (BLSR), OTN SNCP, and OTN/SONET/SDH mesh restoration (e.g., with Optical Signal and Routing Protocol (OSRP), Automatically Switched Optical Networks (ASON), Generalized Multi Protocol Label Switching (GMPLS), etc.). For networks using a signaling and routing protocol, the loss of a link is especially troubling because it can cause multiple Subnetwork Connection (SNC) channels to mesh restore. Additionally, all downstream network elements will report loss of frame events, whereas only the initial loss of signal at the near end network element and the subsequent AIS defects at the downstream network elements should be reported.

BRIEF SUMMARY OF THE INVENTION

In various exemplary embodiments, the present invention includes a SONET/SDH or OTN framer, a transceiver, a network element, a network, and a method for detecting an unacceptable data sequence or pattern and inserting a keep-alive or pseudo-noise sequence in the data sequence to maintaining framing on subsequent network elements, framers, transceivers, etc. For example, the present invention, upon receiving an unacceptable pattern of zeros or low ones density caused by a loss of signal condition or the like, may insert a pseudorandom noise pattern into the transmitted frame. This allows the downstream network element to continue and maintain a frame lock on the incoming signal, and thus keep the frame overhead and data communications channels from being lost. Preventing the loss frame overhead and data communication channels prevents unnecessary protection switching and facilitates proper fault condition reporting.

In an exemplary embodiment, an optical framer includes detection circuitry monitoring an input data and detecting an unacceptable bit sequence in the input data; signal generator circuitry replacing the input data with replacement data upon detection of the unacceptable bit sequence; and framing circuitry framing one of the input data and the replacement data. The unacceptable bit sequence includes a bit sequence operable for causing a downstream element from the optical framer to lose framing. The unacceptable bit sequence includes one of a sequence of all zeros, a sequence with a low density of ones, and a user-defined sequence. Optionally, the sequence of all zeros includes at least 128 zeros. The replacement data includes a pseudo-noise signal. For the replacement data, the framing circuitry includes proper overhead framing bytes based on a previous last known frame thereby providing a new frame with the replacement data that is interpreted as "in frame" by downstream network elements. Optionally, the framing circuitry is configured to frame the replacement data according to SONET/SDH, and the framing circuitry is configured to insert A1 and A2 bytes, K-bytes, line and section Data Communication Channel bytes, B1 and B2 bytes, pointer processing bytes, and Section Trace bytes. Alternatively, the framing circuitry is configured to frame the replacement data according to Optical Channel Transport Unit k (OTUk), and the framing circuitry is configured to insert Frame Alignment Signal bytes, Section Monitoring bytes, General Communication Channel bytes, Forward Error Correction, and Bit Interleaved Parity 8. The optical framer may be used for signal operating with mesh restoration.

In another exemplary embodiment, a network element includes an input optical port receiving an input data signal; and an output optical port transmitting an output data signal, wherein the output data signal derived from at least a portion of the input signal, and wherein the output optical port comprising framing circuitry configured to frame the output data and to replace the output data with replacement data upon detection of an unacceptable data sequence in the output data. The unacceptable bit sequence includes a bit sequence operable for causing a downstream element from the network element to lose framing; and the unacceptable bit sequence includes one of a sequence of all zeros, a sequence with a low density of ones, and a user-defined sequence. The replacement data includes a pseudo-noise signal. For the replacement data, the framing circuitry includes proper overhead framing bytes based on a previous last known frame thereby providing a new frame with the replacement data that is interpreted as "in frame" by downstream network elements. Optionally, the framing circuitry is configured to frame the replacement data according to SONET/SDH; and wherein the framing circuitry is configured to insert A1 and A2 bytes, K-bytes, line and section Data Communication Channel bytes, B1 and B2 bytes, pointer processing bytes, and Section Trace bytes. Alternatively, the framing circuitry is configured to frame the replacement data according to Optical Channel Transport Unit k (OTUk); and wherein the framing circuitry is configured to insert Frame Alignment Signal bytes, Section Monitoring bytes, General Communication Channel bytes, Forward Error Correction, and Bit Interleaved Parity 8.

In yet another exemplary embodiment, a method includes receiving a data sequence; monitoring the data sequence for acceptability, wherein acceptability comprises a sequence of bits that will not cause a downstream element to lose framing; if the data sequence is acceptable, framing the data sequence and transmitting the framed data sequence; and if the data sequence is unacceptable, replacing the data sequence with a replacement data sequence, framing the replacement data sequence and transmitting the framed replacement data sequence.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides systems and methods for inserting pseudo-noise in a data stream based on an unacceptable input data sequence in an optical network thereby preventing unnecessary loss of frame in SONET/SDH or Optical Transport Network (OTN) systems. The present invention includes a SONET/SDH or OTN framer, a transceiver, a network element, a network, and a method for detecting an unacceptable data sequence or pattern and inserting a keep-alive or pseudo-noise sequence in the data sequence to maintaining framing on subsequent network elements, framers, transceivers, etc. For example, the present invention, upon receiving an unacceptable pattern of zeros or low ones density caused by a loss of signal condition or the like, may insert a pseudorandom noise pattern into the transmitted frame. This allows the downstream network element to continue a frame lock on the incoming signal, and thus keep the frame overhead and data communications channels from being lost. Preventing the loss frame overhead and data communication channels prevents unnecessary protection switching and facilitate proper fault condition reporting.

The recent evolution to switching large frames of data without performing a demultiplexing step has highlighted the ability of faults to propagate to downstream network elements. These faults cause unintended consequences which should be attended to at the near end network element. The nature of OTN framing accentuates this problem causing framing issues for all downstream network elements when an upstream network element goes out of frame. This failure causes unnecessary mesh restoration events and other protection switches due to frame loss at downstream network elements. The near end network element will detect a loss of signal after three (3) microseconds and insert an alarm indication signal (AIS) as per standards (SONET/SDH/OTN), but the out of frame on the downstream network elements will be detected during this short interval. The all zeros pattern transmitted downstream causes an out of frame (OOF) and an incoming alignment error (IAE). A downstream framer should not see these conditions. For a loss of frame (LOF) to be declared, the OOF condition must persist for 3 milliseconds.

In response to this issue, the near end network element instead of propagating the all zeros pattern, should insert a pseudorandom noise pattern into the downstream transmitted frames' payloads thereby preventing LOF. In general, a downstream network element can accommodate an all zeros pattern and keep frame lock for at least 128 bits. This bit stream length should be used as the trigger for the near end network element to insert the noise pattern to prevent a loss of lock at the far end network element. Although some level of lab testing may be used to fine tune the number of consecutive zero bits the far end receiver can handle without causing a loss of lock condition.

Figure 1:
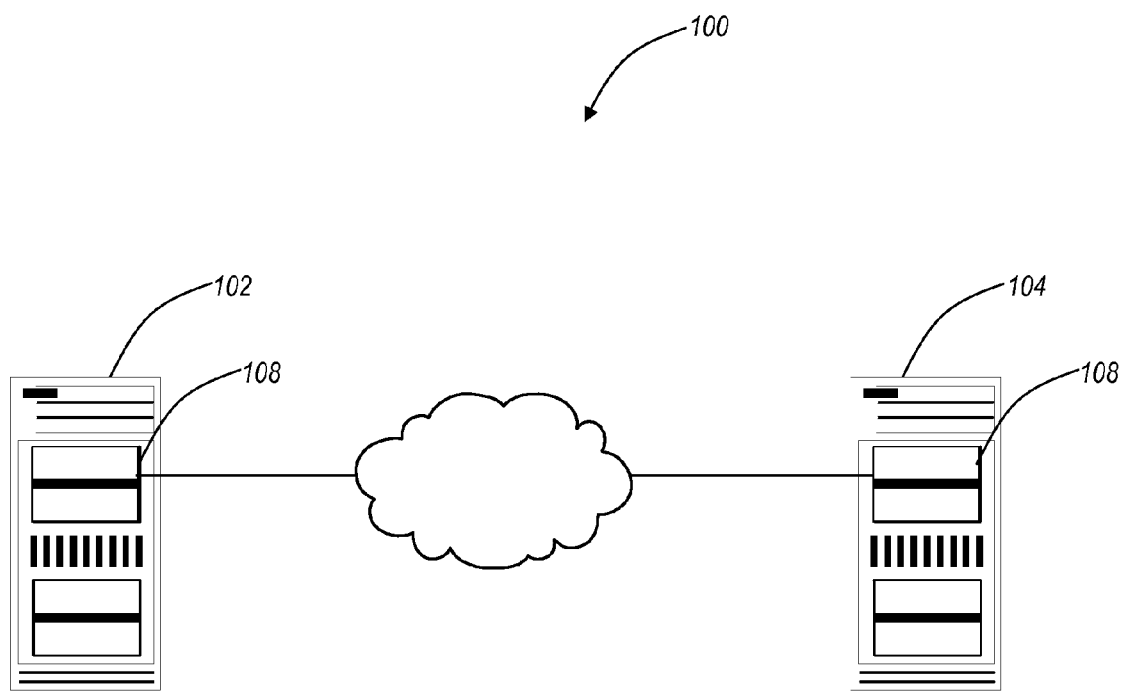
FIG. 1 is a block diagram of a network with network elements configured to detect unacceptable input data sequences and inserting pseudo-noise in a data stream thereon.

Referring to FIG. 1, in an exemplary embodiment, a block diagram illustrates a network 100 with network elements 102, 104 configured to detect unacceptable input data sequences and inserting pseudo-noise in a data stream thereon. The network elements 102, 104 are configured to operate Synchronous Optical Network (SONET), Synchronous Digital Hierarchy (SDH), or Optical Transport Network (OTN). Each of the network elements 102, 104 may include various components such as transceivers 108, switches, common equipment, etc. The components associated with the network elements 102, 104 may be interconnected together using a bus, backplane, midplane, or another suitable interconnection arrangement that facilitates communication therebetween. It should be appreciated that FIG. 1 depicts the components in the network element in an oversimplified manner, and a practical embodiment may include additional components and suitably configured processing logic to support known or conventional operating features that are not described in detail herein. FIG. 1 is also illustrated in a unidirectional manner for illustration purposes from the network element 102 to the egress transceiver 104, and those of ordinary skill in the art will recognize that the implementation may include complementary components forming a bidirectional configuration. In general, the network element 102 receives an input data stream from an external network connection, the network element 102 performs some processing on the input data stream, and a transceiver 108 transmits a processed data stream to an external network connection. Note, the processing by the network element 102 may include anything, such as time division multiplexed switching, optical switching, data switching or routing, and the like. The transceivers 108 may include optical transmitters and receivers configured to transmit/receive SONET/SDH (OC-48/STM-16, OC-192/STM-64, OC-768/STM-256, etc.) or OTN (OTU1, OTU2, OTU3, etc.) framed signals and to interface these signals to/from the other components as electrical signals, i.e. perform an optical-to-electrical conversion and vice versa.

In an exemplary embodiment, the network elements 102, 104 and the transceivers 108 may be configured to detect an unacceptable bit sequence in the output data stream and insert another signal into the data stream thereon. As described herein, an inserted signal may be a pseudo-noise signal or another type of signal for purposes of "keep alive" of the framing in downstream nodes. Alternatively, the network elements 102, 104 and the transceivers 108 may be configured to insert another signal based upon detection of a fault, unacceptable data signal, etc. As described herein, an unacceptable bit sequence in a data signal may include any bit sequence which may be detrimental to high-speed OTN or SONET/SDH systems. For example, in one embodiment, the unacceptable bit sequence may be an all zeroes pattern for 64 bits, 128 bits or greater. Also, the unacceptable bit sequence may be a sequence with a low density of ones. Optionally, the unacceptable bit sequence may be a user-definable attribute associated with the network 100. For example, different bit rate systems may behave differently with respect to maintaining frame lock in the presence of an unacceptable bit sequence. As such, the network elements 102, 104 and the transceivers 108 may be set to a particular bit sequence to act upon for inserting the signal. This allows network operators and equipment vendors to adapt the network elements 102, 104 and the transceivers 108 based upon testing and field conditions.

The present invention provides a different bit sequence replacing a detected unacceptable bit sequence prior to the unacceptable bit sequence being transmitted (in full or part) to downstream nodes. Thus, the present invention maintains framing, etc. in the system. The replaced bit sequence may be any sequence of bits besides the unacceptable bit pattern. In an exemplary embodiment, the replaced bit sequence includes a bit sequence of noise or pseudo-noise, i.e. randomly generated bit sequence. Alternatively, the replaced bit sequence may include a predetermined bit sequence. Of note, the replaced bit sequence is inserted by the network elements 102, 104 and the transceivers 108 into payload (OTN or SONET/SDH). This replaced bit sequence includes the proper overhead framing bytes (Frame Alignment Signal (FAS) for OTN and A1, A2 bytes for SONET/SDH) based on the previous last known frame; thus the new frame with the replaced bit sequence is interpreted as "in frame" by downstream network elements. The replaced bit sequence also includes the overhead bytes/bits normally generated by the near end network element; specifically Section Monitoring (SM) overhead bytes for OTN, or Line overhead bytes for SONET/SDH. All other overhead bytes/bits may be consistent with the last known good state; for instance, the SONET K1/K2 bytes may be consistent with the previously transmitted state. Additionally, the Bit interleaved parity 8 (BIP-8) values may be inserted consistently to suppress downstream error accumulation. The noise insertion may end when the near end network element either recovers from the loss of signal condition or inserts AIS in the downstream direction.

Figure 2:
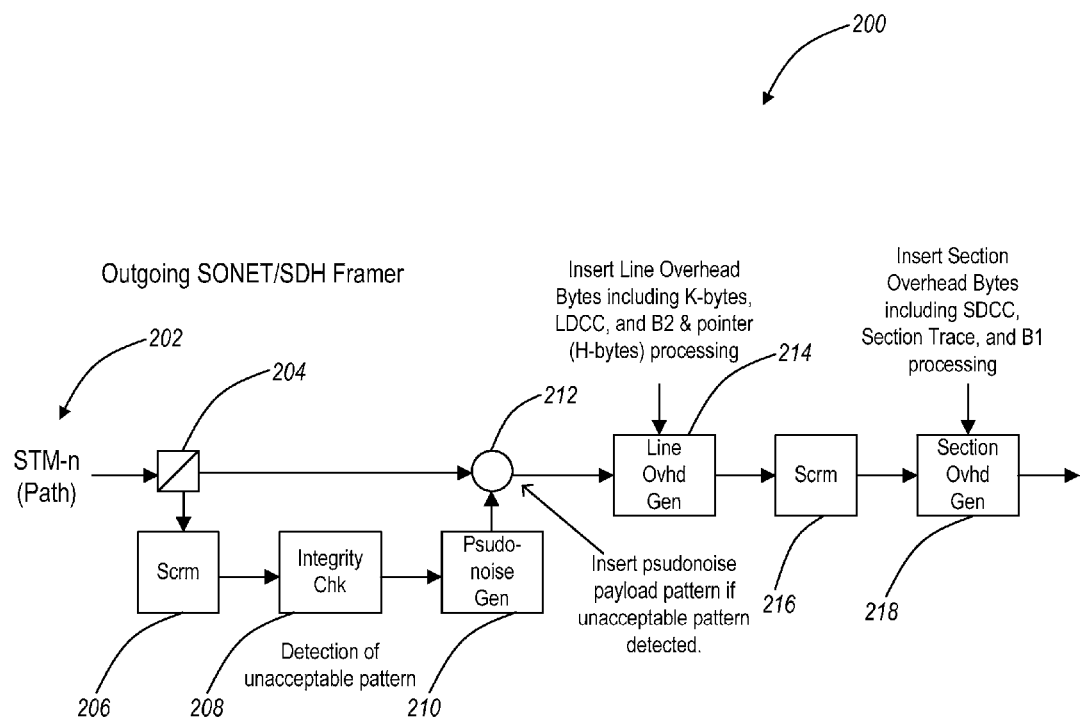
FIG. 2 is a block diagram of an outgoing SONET/SDH framer configured to replace an unacceptable bit sequence according to the present invention.

Referring to FIG. 2, in an exemplary embodiment, a block diagram illustrates an outgoing SONET/SDH framer 200 configured to replace an unacceptable bit sequence according to the present invention. The outgoing SONET/SDH framer 200 may be an implementation of a framer 112 associated with the transceiver 108 in FIG. 1 (assuming the network elements 102, 104 form a SONET/SDH connection). The outgoing SONET/SDH framer 200 receives an input path signal 202, such as, for example, a Synchronous Transport Module unit n (STM-n). The path signal 202 is split 204 as the outgoing SONET/SDH framer 200 is configured to monitor the path signal 202 for an unacceptable bit sequence. To monitor the path signal 202, the outgoing SONET/SDH framer 200 includes a scrambler 206 that scrambles the path signal 202 and connects to an integrity check 208. The integrity check 208 is configured to detect an unacceptable bit pattern as described herein. The integrity check 208 connects to a pseudo-noise generator 210 which in turn connects to a selector element 212. The selector element 212 is configured to select one of the path signal 202 or an output of the pseudo-noise generator 210 based upon whether or not there is an unacceptable bit pattern. Specifically, the selector element 212 is configured to pass through the path signal 202 in the absence of an unacceptable bit pattern and to replace the path signal 202 with the output of the pseudo-noise generator 210 in the presence of the unacceptable bit pattern.

Subsequent to the selector element 212, the SONET/SDH framer 200 includes a line overhead generator 214 configured to insert line overhead bytes including K-bytes, line Data Communication Channel (LDCC) bytes, B2 bytes, and pointer processing bytes (H-bytes). The line overhead generator 214 connects to a scrambler 216 which connects to a section overhead generator 218. The section overhead generator 218 is configured to insert section overhead bytes including section Data Communication Channel (SDCC) bytes, section trace bytes, and B1 processing bytes. An output of the section overhead generator 218 includes a SONET/SDH framed signal including either the path signal 202 or output of the pseudo-noise generator 210 if there is an unacceptable bit sequence detected.

Figure 3:
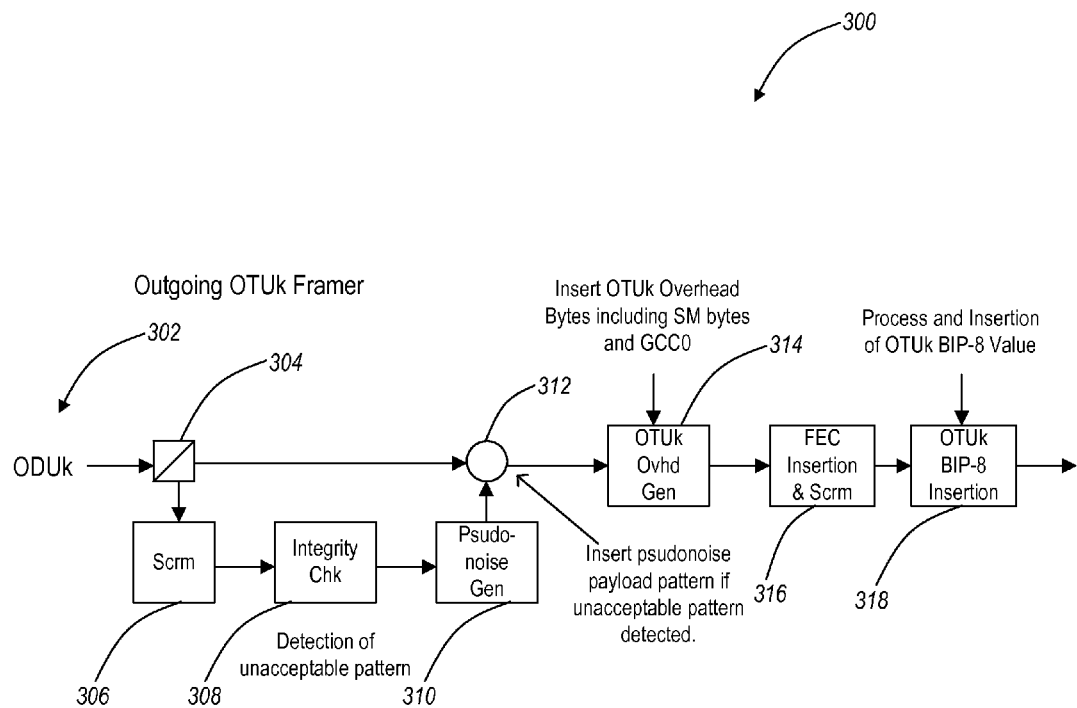
FIG. 3 is a block diagram of an outgoing OTN framer configured to replace an unacceptable bit sequence according to the present invention.

Referring to FIG. 3, in an exemplary embodiment, a block diagram illustrates an outgoing Optical Channel Transport Unit k (OTUk) framer 300 configured to replace an unacceptable bit sequence according to the present invention. The outgoing OTUk framer 300 may be an implementation of a framer associated with the transceiver 108 in FIG. 1 (assuming the network elements 102, 104 form an OTN connection). The outgoing OTUk framer 300 receives an input path signal 302, such as, for example, an Optical Channel Data Unit (ODUk). The path signal 302 is split 304 as the outgoing OTUk framer 300 is configured to monitor the path signal 302 for an unacceptable bit sequence. To monitor the path signal 302, the outgoing OTUk framer 300 includes a scrambler 306 that scrambles the path signal 302 and connects to an integrity check 308. The integrity check 308 is configured to detect an unacceptable bit pattern as described herein. The integrity check 308 connects to a pseudo-noise generator 310 which in turn connects to a selector element 312. The selector element 312 is configured to select one of the path signal 302 or an output of the pseudo-noise generator 310 based upon whether or not there is an unacceptable bit pattern. Specifically, the selector element 312 is configured to pass through the path signal 302 in the absence of an unacceptable bit pattern and to replace the path signal 302 with the output of the pseudo-noise generator 310 in the presence of the unacceptable bit pattern.

Subsequent to the selector element 312, the OTUk framer 300 includes an OTUk overhead generator 314 that is configured to insert OTUk overhead bytes including Section Monitoring (SM) bytes and General Communication Channel (GCC) bytes. The OTUk overhead generator 314 connects to a Forward Error Correction (FEC) Insertion and Scrambler 316 that is configured to compute and append FEC data and to scramble the input signal. The Insertion and Scrambler 316 connects to an OTUk BIP-8 Insertion 318 that processes and inserts an OTUk BIP-8 value. An output of the OTUk BIP-8 Insertion 318 includes an OTUk framed signal including either the path signal 302 or output of the pseudo-noise generator 310 if there is an unacceptable bit sequence detected.

The various components described herein in FIGS. 2 and 3 may be part of a line card, line module, pluggable module, or the like that is configured to transmit OTN or SONET/SDH signals. For example, the components, collectively or individually, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the components include processing logic that may be configured to carry out the functions, techniques, and processing tasks associated with the operations, as described herein. Furthermore, the steps of a method or algorithm described in connection with the embodiments disclosed herein may be embodied directly in hardware, in firmware, in a software module executed by a processor, or in any practical combination thereof. In one exemplary embodiment, the transceivers 102a, 102b may include a pluggable or mountable optical unit disposed on a circuit board. The various other components may be realized as processing logic described above with electrical interconnects to the transceivers 108. Further, the various components may be realized on separate circuit boards with interconnects via a backplane, midplane, etc.

Figure 4:
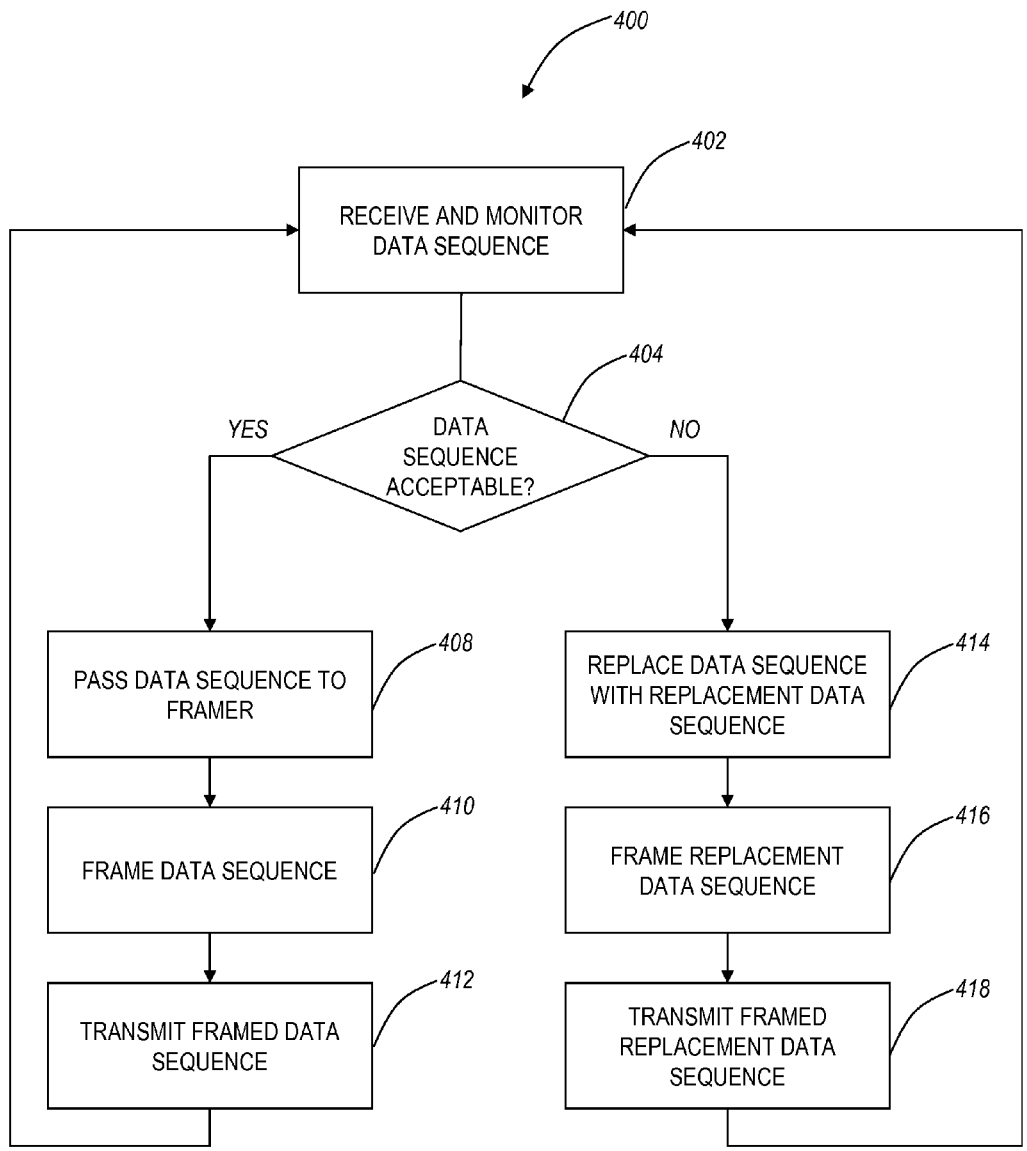
FIG. 4 is a flowchart of a method for detecting and replacing unacceptable bit sequences to maintain downstream framing in an optical network.

FIG. 4 is a flowchart of a method 400 for detecting and replacing unacceptable bit sequences to maintain downstream framing in an optical network. The method 400 may be implemented via the network elements 102, 104 and the transceivers 108, the SONET/SDH framer 200, the OTUk framer 300, or the like. The method 400 is configured to receive and monitor a data sequence (step 402). For example, the data sequence may be a path input (SONET/SDH), an ODUk input (OTN), or the like. The method 400 is configured to both frame this data sequence and to replace the data sequence with a replacement data sequence if the data sequence is unacceptable (step 404). If the data sequence is acceptable, the data sequence is passed to a framer (step 408), the data sequence is framed (step 410), and the framed data sequence is transmitted (step 412) with the method 400 returning to step 402. If the data sequence is unacceptable as described herein, the data sequence is replaced with a replacement data sequence as described here (step 414), the replacement data sequence is framed (step 416), and the framed replacement data sequence is transmitted (step 414) with the method 400 returning to step 402.

With the advent of OTN switching, multiple problems require new approaches to solve. In the present invention, the application of the noise pattern preserves proper network communication between downstream network elements. Of greatest importance is the limitation of protection events due to this interruption of communications. Mesh restoration will be the greatest benefactor to this enhancement; reducing avoidable network outages. The present invention also ensures proper fault reporting on downstream network elements.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical framer, comprising:
   detection circuitry monitoring an input data and detecting an unacceptable bit sequence in the input data;
   signal generator circuitry replacing the input data with replacement data upon detection of the unacceptable bit sequence; and
   framing circuitry framing one of the input data and the replacement data;
   wherein the replacement data comprises a pseudo-noise signal that replaces the unacceptable bit sequence.

2. The optical framer of claim 1, wherein the unacceptable bit sequence comprises a bit sequence operable for causing a downstream element from the optical framer to lose framing.

3. The optical framer of claim 2, wherein the unacceptable bit sequence comprises one of a sequence of all zeros, a sequence with a low density of ones, and a user-defined sequence.

4. The optical framer of claim 3, wherein the sequence of all zeros comprises at least 128 zeros.

5. The optical framer of claim 1, wherein, for the replacement data, the framing circuitry includes proper overhead framing bytes based on a previous last known frame thereby providing a new frame with the replacement data that is interpreted as "in frame" by downstream network elements.

6. The optical framer of claim 5, wherein the framing circuitry is configured to frame the replacement data according to SONET/SDH.

7. The optical framer of claim 6, wherein the framing circuitry is configured to insert A1 and A2 bytes, K-bytes, line and section Data Communication Channel bytes, B1 and B2 bytes, pointer processing bytes, and Section Trace bytes.

8. The optical framer of claim 5, wherein the framing circuitry is configured to frame the replacement data according to Optical Channel Transport Unit k (OTUk).

9. The optical framer of claim 8, wherein the framing circuitry is configured to insert Frame Alignment Signal bytes, Section Monitoring bytes, General Communication Channel bytes, Forward Error Correction, and Bit Interleaved Parity 8.

10. The optical framer of claim 1, wherein the optical framer is used for signal operating with mesh restoration.

11. A network element, comprising:
    an input optical port receiving an input data signal; and
    an output optical port transmitting an output data signal, wherein the output data signal is derived from at least a portion of the input data signal, and wherein the output optical port comprises framing circuitry configured to frame the output data and to replace the output data with replacement data upon detection of an unacceptable data sequence in the output data;
    wherein the replacement data comprises a pseudo-noise signal that replaces the unacceptable data sequence.

12. The network element of claim 11, wherein the unacceptable bit sequence comprises a bit sequence operable for causing a downstream element from the network element to lose framing; and
    wherein the unacceptable bit sequence comprises one of a sequence of all zeros, a sequence with a low density of ones, and a user-defined sequence.

13. The network element of claim 11, wherein, for the replacement data, the framing circuitry includes proper overhead framing bytes based on a previous last known frame thereby providing a new frame with the replacement data that is interpreted as "in frame" by downstream network elements.

14. The network element of claim 13, wherein the framing circuitry is configured to frame the replacement data according to SONET/SDH; and
    wherein the framing circuitry is configured to insert A1 and A2 bytes, K-bytes, line and section Data Communication Channel bytes, B1 and B2 bytes, pointer processing bytes, and Section Trace bytes.

15. The network element of claim 13, wherein the framing circuitry is configured to frame the replacement data according to Optical Channel Transport Unit k (OTUk); and wherein the framing circuitry is configured to insert Frame Alignment Signal bytes, Section Monitoring bytes, General Communication Channel bytes, Forward Error Correction, and Bit Interleaved Parity 8.

16. A method, comprising:

receiving a data sequence;

monitoring the data sequence for acceptability, wherein acceptability comprises a sequence of bits that will not cause a downstream element to lose framing;

if the data sequence is acceptable, framing the data sequence and transmitting the framed data sequence; and if the data sequence is unacceptable, replacing the data sequence with a replacement data sequence, framing the replacement data sequence and transmitting the framed replacement data sequence;

wherein the replacement data sequence comprises a pseudo-noise signal that replaces the data sequence.

* * * * *